J. E. FRIES.
POWER TRANSMISSION MECHANISM.
APPLICATION FILED OCT. 2, 1907.
920,946.
Patented May 11, 1909.
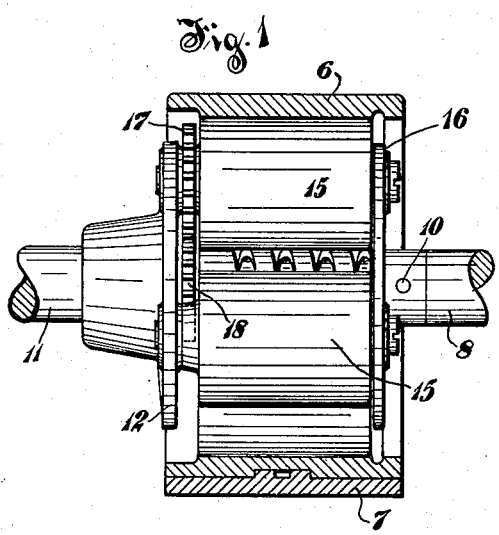
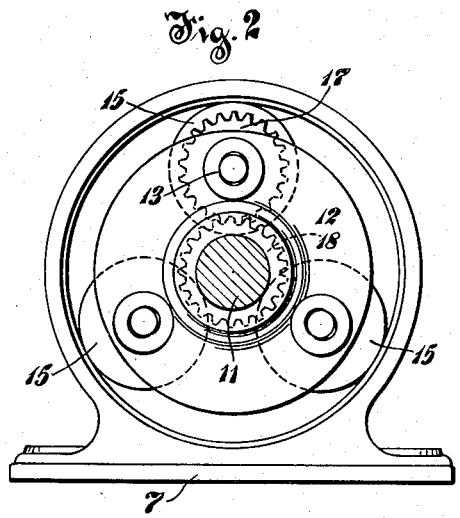
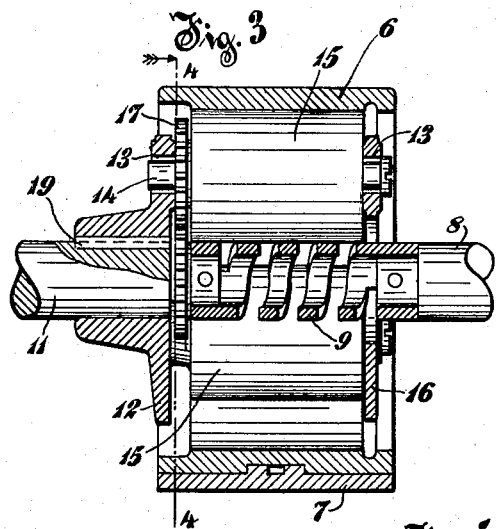
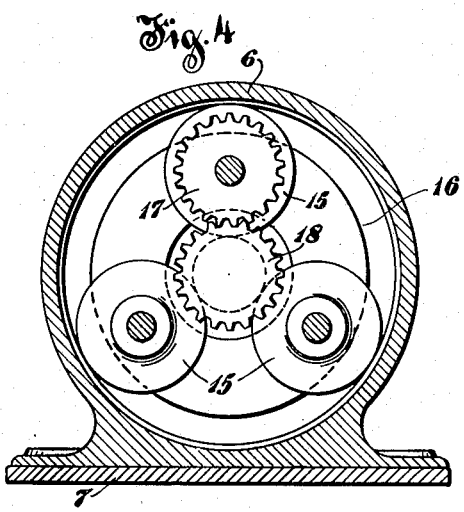
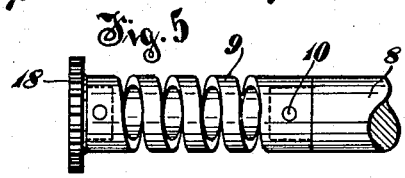
Witnesses
Inventor
Joens Elias Fries
By Chas. E. Lord
Attorney

UNITED STATES PATENT OFFICE.

JOENS ELIAS FRIES, OF MILWAUKEE, WISCONSIN.

POWER-TRANSMISSION MECHANISM.

No. 920,946.　　　Specification of Letters Patent.　　Patented May 11, 1909.

Application filed October 2, 1907. Serial No. 395,543.

*To all whom it may concern:*

Be it known that I, JOENS ELIAS FRIES, a citizen of the United States, residing at Milwaukee, in the county of Milwaukee and State of Wisconsin, have invented certain new and useful Improvements in Power-Transmission Mechanism, of which the following is a full, clear, and exact specification.

My present invention relates to means for transmitting power and particularly to a speed changing apparatus adapted for use in changing the angular velocity imparted by a driving member to a driven member.

In friction gearing of the kind composed of a number of friction wheels mounted on a rotatable support and arranged between and in contact with a rapidly rotating shaft and a relatively fixed surrounding sleeve, there has been experienced heretofore considerable difficulty in maintaining the proper contact relationship between the parts. Furthermore there has been considerable loss in the device due to excessive sliding friction.

The object of my present invention is to avoid the difficulties heretofore experienced in apparatus of this character, and in carrying out my invention I provide the central or high-speed shaft with a resilient expansible extension and maintain the outer end of said expansible extension in a positive and definite relation to the rollers co-acting therewith, so that a rolling contact without slipping is maintained, and the peripheral speed of the rollers and the peripheral speed of said expansible extension are maintained at a fixed ratio. This I accomplish preferably by means of a set of intermeshing gearing between the said extension and at least one of said rollers.

For a clearer understanding of my invention reference may be had to the accompanying drawing, in which, Figure 1 shows a side view of my improved device with part of the casing cut away so as to show the operating parts; Fig. 2 is an end elevation of the device shown in Fig. 1 viewed from the left hand end; Fig. 3 is a sectional longitudinal elevation of the apparatus; Fig. 4 is a sectional view on the line 4—4 of Fig. 3 viewed in the direction of the arrow; and Fig. 5 is a detail elevation of the resilient expansible extension of the high-speed shaft.

Referring now to the drawings, the outer cylindrical casing is indicated by 6, said casing resting upon a stationary support 7.

The high-speed or central shaft of the device is indicated at 8 and includes a shaft which may be driven from any suitable source of power such as a high speed electric motor, or may be attached to any desired translating device if said shaft becomes the driven member. Said shaft 8 is provided with a resilient expansible extension, here shown as a helical spring 9, preferably cut out of a hollow steel tube of proper shape and dimensions. One end of said spring 9 is rigidly fixed to the shaft 8 at 10. The slow-speed shaft 11 has its axis in alinement with that of the high-speed shaft 8 and is provided with a hub carrying a disk 12 in which are formed the bearings 13, preferably radially elongated slots, for receiving the journals 14 of a plurality of rollers 15. The disk 12 is keyed to the slow-speed member 11 as shown at 19 in Fig. 3. I have here illustrated three of the rollers 15 but any convenient number may be employed as desired. The rollers 15 are journaled at their opposite ends in a ring 16 which is also provided with radially elongated slots 13.

In assembling my improved apparatus the parts should be put together with the spring 9 in contact with the rollers 15 only along a small part of its length and the first result of increased load will be increased length of contact between the spring and rollers. As the friction in an apparatus of this character is proportional to the pressure between the moving parts, it will be seen that upon a further increase of load an actual unwinding of the spring, that is changing its size, is not necessary for increasing the pressure but this is accomplished by the microscopical deformation due to higher internal stresses. As the shaft 8 rotates, the spring 9 bearing against the rollers 15 will cause rotation of the latter, which, rolling along the inner surface of the casing 6, in turn will cause the rotation of the slow-speed member 11 according to the ratio of the diameter of the coil spring or resilient extension 9 and the rollers 15.

It is desirable in a device of this character to make the sliding friction as small as possible. In my improved apparatus I reduce this sliding friction practically to zero by maintaining the outer end of the expansible extension 9 of the high-speed shaft in a definite position relative to the rollers. This results in maintaining a fixed ratio of angular velocity between the high-speed member and said rollers, that is, these parts have a fixed ratio of peripheral speed and therefore engage with purely rolling friction. Such result is obtained by providing at least one of the rollers 15 with a gear 17 which is always in mesh with a gear 18 on the outer end of the coil spring 9.

I do not desire to limit my invention to the specific modification herein described but aim in the appended claims to cover obvious changes which would clearly come within the scope of the invention.

What I claim is:

1. The combination with a high-speed member and a low-speed member, of a cylindrical casing, a number of rollers carried by said low-speed member and making contact with said high-speed member and the inner surface of said casing, and positively acting means for maintaining the peripheral speed of said rollers and the peripheral speed of said high-speed member at a fixed ratio.

2. The combination with a high-speed member and a low-speed member, of a cylindrical casing, a number of rollers rotatably mounted on said low-speed member and making contact with said high-speed member and casing, said high-speed member having resilient expansible means for maintaining contact with said rollers, and positively acting means for maintaining the peripheral speed of the expansible extension and the peripheral speed of the rollers at a fixed ratio.

3. In a power transmission mechanism, the combination with a high-speed member and low-speed member, of a cylindrical casing, a number of rollers rotatably mounted in said low-speed member and making contact with said high-speed member and said casing, said high-speed member being formed of resilient and expansible material for maintaining contact with said rollers, and a set of gears carried by said high-speed member and at least one of said rollers for forcing the peripheral speed of said driving member to bear a fixed ratio to that of the rollers.

4. In a power transmission device, the combination with a high-speed member and a low-speed member, of an annular cylindrical casing, a number of rollers carried by said low-speed member and making contact with said high-speed member and the inner surface of said casing, and positively acting means for maintaining a purely rolling contact between the high-speed member and said rollers during the operation of the device under load.

In testimony whereof I affix my signature, in the presence of two witnesses.

JOENS ELIAS FRIES.

Witnesses:
ISAAC A. KELLER,
WALTER E. SARGENT.